US012048663B2

(12) United States Patent
Venturi et al.

(10) Patent No.: US 12,048,663 B2
(45) Date of Patent: Jul. 30, 2024

(54) REMOVABLE ELECTRIC PROPULSION SYSTEM FOR A ROLLING OBJECT, IN PARTICULAR A BED

(71) Applicant: IFP Energies nouvelles, Rueil-Malmaison (FR)

(72) Inventors: Stephane Venturi, Rueil-Malmaison (FR); Bertrand Lecointe, Rueil-Malmaison (FR); Sandrine Debain, Rueil-Malmaison (FR); Elena Sanz, Rueil-Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 595 days.

(21) Appl. No.: 17/415,413

(22) PCT Filed: Dec. 3, 2019

(86) PCT No.: PCT/EP2019/083427
§ 371 (c)(1),
(2) Date: Jun. 17, 2021

(87) PCT Pub. No.: WO2020/126458
PCT Pub. Date: Jun. 25, 2020

(65) Prior Publication Data
US 2022/0409461 A1 Dec. 29, 2022

(30) Foreign Application Priority Data
Dec. 18, 2018 (FR) ........................................ 1873165

(51) Int. Cl.
*A61G 7/08* (2006.01)
*B62B 5/00* (2006.01)

(52) U.S. Cl.
CPC .............. *A61G 7/08* (2013.01); *B62B 5/0079* (2013.01); *B62B 5/0043* (2013.01); *B62B 2202/30* (2013.01)

(58) Field of Classification Search
CPC ....... B62B 5/0043; B62B 5/0079; B62B 3/06; A61G 7/08
See application file for complete search history.

(56) References Cited

U.S. PATENT DOCUMENTS

| 7,174,093 B2 * | 2/2007 | Kidd ...................... A61G 5/047 |
| | | 310/67 R |
| 2003/0079923 A1 * | 5/2003 | Johnson .................. B62B 5/005 |
| | | 180/19.3 |

(Continued)

FOREIGN PATENT DOCUMENTS

| WO | 01/85086 A1 | 11/2001 |
| WO | 03/034970 A1 | 5/2003 |

(Continued)

OTHER PUBLICATIONS

International Search Report PCT/EP2019/083427, mailed Feb. 7, 2020; English translation submitted herewith (5 pgs.).

*Primary Examiner* — Tony H Winner
*Assistant Examiner* — Hosam Shabara
(74) *Attorney, Agent, or Firm* — FITCH, EVEN, TABIN & FLANNERY, LLP (57) ABSTRACT

The present invention relates to an electric propulsion system (1) for a rolling object, comprising a frame (2) with at least one motorized wheel (3), and at least one non-motorized wheel (4), a handlebar (6) and coupling means (5). Coupling means (5) are intended for gripping, orientation and lifting of at least one wheel of the rolling load. The (Continued)

means of orienting the wheel of the rolling object orient the wheel perpendicular to the longitudinal direction (x) of the frame.

20 Claims, 3 Drawing Sheets

(56) References Cited

U.S. PATENT DOCUMENTS

| | | | | |
|---|---|---|---|---|
| 2006/0102392 A1* | 5/2006 | Johnson | ............... | B62D 7/023 |
| | | | | 180/19.1 |
| 2014/0186148 A1* | 7/2014 | March | ............... | B66F 5/04 |
| | | | | 414/427 |
| 2015/0136498 A1* | 5/2015 | Madsen | ............... | A61G 7/08 |
| | | | | 180/11 |
| 2019/0262217 A1* | 8/2019 | Kanaya | ............... | A63B 21/4045 |

FOREIGN PATENT DOCUMENTS

| | | | |
|---|---|---|---|
| WO | 2012/171079 A1 | 12/2012 | |
| WO | 2013/156030 A1 | 10/2013 | |

\* cited by examiner

REMOVABLE ELECTRIC PROPULSION SYSTEM FOR A ROLLING OBJECT, IN PARTICULAR A BED

CROSS-REFERENCE TO RELATED APPLICATIONS

This application is a U.S. national phase application filed under 35 U.S.C. § 371 of International Application No. PCT/EP2019/083427, filed Dec. 3, 2019, designating the United States, which claims priority from French Patent Application No. 1873165, filed Dec. 18, 2018, which are hereby incorporated herein by reference in their entirety.

FIELD OF THE INVENTION

The invention relates to the field of transport of rolling objects, in particular rolling beds, hospital beds for example.

Moving rolling heavy loads can lead to difficulties for users, in particular if this action is repeated, such as musculoskeletal disorders.

BACKGROUND OF THE INVENTION

In order to make the movement of rolling heavy loads easier and more ergonomic, it has been considered to equip these heavy loads with electric machines. For example, a first idea has consisted in providing each hospital bed with an electric wheel drive system. Such a solution is expensive because it requires changing or modifying all the beds, which hospitals cannot afford. Furthermore, the drive system and the battery increase the weight of the bed. Therefore, when the battery is discharged, the effort required to move the bed is greater.

Similarly, in the field of logistics or trade, it has been envisaged to make all trolleys electric. Again, such a solution is expensive.

One alternative is to provide a removable propulsion system for rolling objects. Several technical solutions have been considered.

For example, patent application WO-01/85,086 describes a motorized propulsion system for a bed. The propulsion system is configured for coupling to one or more points of the bed. Due to the coupling means provided for this propulsion system, this system cannot be universal and suitable for different rolling objects. Indeed, it cannot be coupled to a rolling object not provided with a coupling part. In addition, for this propulsion system, all the wheels of the rolling object remain in contact with the ground. Therefore, the orientation of the coupled assembly (propulsion system and bed) is more complicated, the frictional forces are high and the motorized wheel requires more power.

Patent application WO-2012/171,079 describes a second propulsion system for a hospital bed. The propulsion system is configured to lift two wheels of the bed. However, the wheel gripping mechanism is complex and bulky: the lateral dimension (direction parallel to the axis of the motorized wheels) is great (greater than the width of the bed wheels) and it can exceed the lateral dimensions of the bed, which may be inconvenient for moving the bed, in particular in a reduced space such as a hospital corridor or lift.

Patent application WO-2013/156,030 describes a third propulsion system for a hospital bed. The propulsion system is configured to lift two wheels of the bed. However, the system has great lateral (direction parallel to the axis of the motorized wheels) and longitudinal (direction perpendicular to the axis of the wheels) dimensions: the rear platform protrudes from the bed and the distance between the non-motorized wheels can exceed the dimensions of the bed, which may be inconvenient for moving the bed, in particular in a reduced space such as a hospital corridor or lift.

SUMMARY OF THE INVENTION

In order to overcome these drawbacks, the present invention relates to an electric propulsion system for a rolling object, comprising a frame with at least one motorized wheel, and at least one non-motorized wheel, a handlebar and coupling means. The coupling means are intended for gripping, orientation and lifting of at least one wheel of the rolling load. The means of orienting the wheel of the rolling object orient the wheel perpendicular to the longitudinal direction of the frame. Thus, the movement of heavy rolling objects is made easy and ergonomic. Furthermore, the dimensions of the coupling means are reduced, in particular the lateral dimensions, and the propulsion system is more compact, which allows the rolling object to be moved, including in a reduced space. Moreover, these coupling means are universal and suitable for many types of rolling objects, because the rolling object requires no specific coupling means.

The invention relates to a removable electric propulsion system for a rolling object, said propulsion system comprising a frame provided with at least one wheel driven by an electric machine, and at least one non-driven wheel, a handlebar and means for coupling said propulsion system to said rolling object, said coupling means comprising means for gripping and lifting at least one wheel of said rolling object. Said coupling means comprise means for orienting at least one wheel of said rolling object in a direction substantially perpendicular to the longitudinal direction of said frame of said propulsion system.

According to one embodiment, when said propulsion system is coupled to a rolling object, said non-driven wheels are positioned under said rolling object.

According to an implementation, when said propulsion system is coupled to a rolling object, said wheel driven by said electric machine is positioned outside said rolling object.

According to an aspect, when said propulsion system is coupled to a rolling object, said wheel driven by said electric machine is positioned under the rolling object.

Advantageously, said frame comprises a platform, notably for providing support for a user.

Preferably, when said propulsion system is coupled to a rolling object, said platform is positioned under said rolling object.

According to a feature, said handlebar is articulated with respect to the frame around a horizontal axis.

Alternatively, said handlebar is articulated with respect to an orientation axis of said wheel driven around a horizontal axis, said orientation axis rotating with respect to the frame around a vertical axis.

According to an implementation, said non-driven wheels are wheels orientable around a vertical axis, preferably orientable off-centered wheels.

Advantageously, said non-driven wheels comprise a directional locking device.

According to an embodiment, said propulsion system comprises three or four wheels.

Advantageously, said rolling object is a rolling bed, a trolley, rolling furniture, a wheelchair.

According to an aspect, said handlebar comprises means for controlling said electric machine and/or said coupling means.

According to an embodiment, said wheel driven by said electric machine is arranged at one end of said frame opposite the end of said frame on which said non-driven wheels are arranged.

Furthermore, the invention relates to a coupled assembly made up of a rolling object and an electric propulsion system according to one of the above features, said rolling object being coupled to said electric propulsion system by said coupling means.

BRIEF DESCRIPTION OF THE FIGURES

Other features and advantages of the system according to the invention will be clear from reading the description hereafter of embodiments given by way of non-limitative example, with reference to the accompanying figures wherein.

DETAILED DESCRIPTION OF THE INVENTION

The present invention relates to an electric propulsion system for a rolling object. An electric propulsion system is understood to be a removable system for assisting the movement of the rolling object in order to limit the forces required for the displacement of the rolling object. This electric propulsion system comprises at least one electric machine for driving it. A rolling object is an object comprising at least two wheels in order to move it.

The rolling object can have any shape, it can notably be a rolling bed, in particular such as those used in hospitals, a wheelchair, a trolley, such as those used for logistics, hospital logistics or commercial logistics (such as a shopping trolley) for example, any rolling furniture. Such a rolling object comprises at least two wheels, preferably three or four. Advantageously, at least one wheel, preferably two wheels of the rolling object are idle wheels, in other words, off-centered wheels orientable around a vertical axis. The rolling object is preferably non-motorized.

The electric propulsion system according to the invention comprises:
  a frame provided with at least one motorized wheel, i.e. a wheel driven by an electric machine, and at least one non-motorized wheel, preferably two, i.e. not driven by an electric machine,
  a handlebar enabling handling, displacement and orientation of the propulsion system by a user,
  means for coupling the propulsion system to a rolling object, the coupling means comprise means for gripping and lifting at least one wheel, preferably more wheels, and more preferably two wheels of the rolling object, in other words, the coupling means are configured to grip (grab) and lift at least one wheel of the rolling object.

Coupling is thus achieved with at least one wheel of the rolling object, preferably at least one idle wheel of the rolling object. Therefore, the rolling object does not need to be adapted for the electric propulsion system, which makes the electric propulsion system universal for various rolling objects.

The means for gripping the wheel of the rolling object allow the wheel to be grabbed. For example, these gripping means can comprise a clamp system, a wedging system, magnetic means, adhesive means or any similar system. Advantageously, the gripping means can be movable so as to adapt to any wheel dimension and any wheel track. Movement of the gripping means can be achieved by means of one or more jacks, for example electric cylinders, screw-nut systems, rack and pinion systems, or any similar means.

The means for lifting the wheel allow the wheel of the rolling object to be elevated, so that this wheel of the rolling object no longer touches the ground. The mass of the rolling object supported by this wheel is then transferred to the electric propulsion system. This notably provides the adhesion required for the motivity of the motorized wheel of the electric propulsion system. Lifting can be achieved by means of one or more cylinders, for example electric cylinders, screw-nut systems, rack and pinion systems, or any similar means.

According to the invention, the coupling means further comprise means for orienting the gripped (by the gripping means) wheel in a direction substantially perpendicular to the longitudinal direction of the frame of the propulsion system (in other words, the wheel of the rolling object is oriented in a direction parallel to the lateral direction of the frame). The longitudinal direction of the frame is defined by the direction connecting the motorized wheel to the non-motorized wheel. The longitudinal direction corresponds to the principal direction of displacement of the electric propulsion system. A substantially perpendicular direction is understood to be a direction forming an angle ranging between 80° and 100° relative to the longitudinal direction. Thus, upon propulsion of the rolling object, at least one wheel of the rolling object is gripped, lifted and oriented in a direction perpendicular to the longitudinal direction of the frame. The coupling means thus act on the least thick side of the wheels of the rolling object. This contributes to ensuring that the coupling means have reduced lateral dimensions in relation to the lateral dimensions of the propulsion systems of the prior art (as described for example in patent applications WO-2012/171,079 and WO-2013/156,030), which facilitates their use in reduced spaces such as corridors and lifts. The means of orienting the wheel of the rolling object can be implemented through the displacement of the wheel gripping means. According to an implementation of the invention, the electric propulsion system can perform the following sequence of steps for coupling: gripping the wheel of the rolling object, orienting the wheel of the rolling object in a direction perpendicular to the longitudinal direction of the frame and lifting the wheel of the rolling object.

According to an embodiment of the invention, the electric propulsion system can be configured in such a way that the non-motorized wheel(s) are located under the rolling object when the electric propulsion system is coupled to the rolling object. Thus, a part of the electric propulsion system does not protrude from the rolling object, which facilitates its use in reduced spaces.

According to an implementation of the invention, the electric propulsion system can be configured in such a way that the motorized wheel is located outside the rolling object, along the longitudinal direction of the frame, when the electric propulsion system is coupled to the rolling object. In other words, the part of the frame supporting the motorized wheel protrudes from the rolling object in the longitudinal direction of the frame when the electric propulsion system is coupled to the rolling object.

Alternatively, the electric propulsion system can be configured in such a way that the motorized wheel is located under the rolling object when the electric propulsion system is coupled to the rolling object. Thus, a part of the electric propulsion system does not protrude from the rolling object, which facilitates its use in reduced spaces.

Preferably, the propulsion system can be configured in such a way that the major part of the propulsion system is located under the rolling object when the propulsion system is coupled to the rolling object. Only the part of the frame corresponding to the motorized wheel and the handlebar protrude from the rolling object in the longitudinal direction of the frame.

According to an embodiment, the propulsion system can comprise three or four wheels. When the propulsion system has three wheels, a single wheel can be driven by an electric machine. When the propulsion system has four wheels, two wheels can be driven by an electric machine.

According to an implementation of the invention, the motorized wheel can be arranged at one longitudinal end of the frame and the non-motorized wheels can be arranged at the other longitudinal end of the frame.

The frame can consist of a mechanic-welded assembly.

According to a preferred embodiment, the coupling means are connected to the frame between the motorized wheel and the non-motorized wheel(s). Thus, the longitudinal size of the propulsion system is limited.

According to an aspect of the invention, the frame can comprise a platform. The platform can be used for supporting a load, in particular a user. Preferably, this platform is positioned above the non-motorized wheels. According to a variant of this embodiment, the electric propulsion system is configured in such a way that the platform is located under the rolling object when the electric propulsion system is coupled to the rolling object, which allows the dimensions of the electric propulsion system to be reduced. For this embodiment, the platform cannot be used as a load support when the electric propulsion system is coupled to a rolling object. For example, the platform can be used by a user for use of the propulsion system as an electric scooter when the electric propulsion system is not coupled to a rolling object, which facilitates users' movements between the displacements of two rolling objects. Alternatively, the platform can be used for moving loads when the propulsion system is not coupled to a rolling object.

According to an embodiment of the invention, the handlebar can be articulated with respect to the frame along a horizontal shaft attached to the frame. This horizontal axis may preferably be in the lateral direction of the frame. Thus, the handlebar can pivot about a horizontal axis.

For these two handlebar position variants, the handlebar is integral with no wheel and the movement of the propulsion system is achieved in a similar manner to the movement of a trolley (such as a shopping trolley for example).

According to an alternative, the motorized wheel can be orientable with respect to the frame along a vertical orientation axis, and the handlebar can be articulated or attached to the vertical orientation shaft of the motorized wheel. In other words, the motorized wheel can pivot with respect to the frame about a vertical orientation axis, rotation about this vertical axis being controlled by the movement of the handlebar. This embodiment substantially corresponds to the control of the movement of a pallet truck type system.

In order to facilitate the movement of the electric propulsion system by a user, the handlebar can have control means such as electric machine control means and/or coupling means control means. The electric machine control means allow to start, stop, adjust the speed and/or the torque of the electric assistance. The coupling means control means allow to control the gripping means for gripping the wheel(s) of the rolling object, control the means of lifting the wheel(s) of the rolling object and control the means of orienting the wheels of the rolling object. These controls may consist in moving the elements that make up the coupling means.

According to an embodiment of the invention, the handlebar can be telescopic, foldable and/or removable, so as to facilitate storage of the electric propulsion system by limiting the size thereof. This also allows to limit the size of the propulsion system coupled to a rolling object in a reduced space such as a lift.

According to a variant embodiment, when the propulsion system is coupled to the rolling object, the propulsion system is not necessarily controlled through the handlebar, control can also be performed by rolling object control means such as a handle, a handlebar, or similar means.

The electric propulsion system can further comprise an electric battery for powering the electric machine. The electric battery can be arranged on or under the frame, for example at the longitudinal end of the frame close to the motorized wheel, or at the longitudinal end of the frame close to the non-motorized wheels. Alternatively, the battery can be arranged on the handlebar. Furthermore, the battery can be removable so as to facilitate charging or replacement thereof. Alternatively, the battery may not be removable.

According to an implementation of the invention, the non-motorized wheels can be idle wheels, i.e. off-centered wheels orientable around a vertical axis. In other words, the non-motorized wheels can pivot with respect to the frame about a vertical orientation axis, and the orientation axis of the wheel can be off-centered (non-concurrent) with respect to the vertical orientation axis.

Alternatively, the non-motorized wheels can be wheels orientable around a vertical axis in a non-off-centered manner. In other words, the non-motorized wheels can pivot with respect to the frame about a vertical orientation axis, and the rotation axis of the wheel is aligned with this vertical orientation axis (concurrent with the vertical orientation axis).

Preferably, for the embodiment where the non-motorized wheels are orientable around a vertical axis (off-centered or not), the electric propulsion system can comprise directional locking means that can prevent rotation of the non-motorized wheels around their vertical axis. Thus, control of the directional locking means can facilitate the movement of the electric propulsion system. According to embodiment examples, the directional locking means can be controlled when the electric propulsion system is coupled to a rolling object and when the wheels of the rolling object in contact with the ground are idle wheels. When coupled, the non-motorized wheels are preferably not locked by the directional locking means. When the electric propulsion system is not coupled to the rolling object, the directional locking means is preferably actuated.

The invention further relates to a coupled assembly made up of a rolling object such as a rolling bed and a propulsion system according to any one of the variant combinations described above. The rolling object is coupled to the propulsion system by the coupling means. In other words, at least one wheel of the rolling object is gripped, oriented perpendicular to the longitudinal direction of the frame and lifted by the coupling means of the propulsion system.

Figure 1:
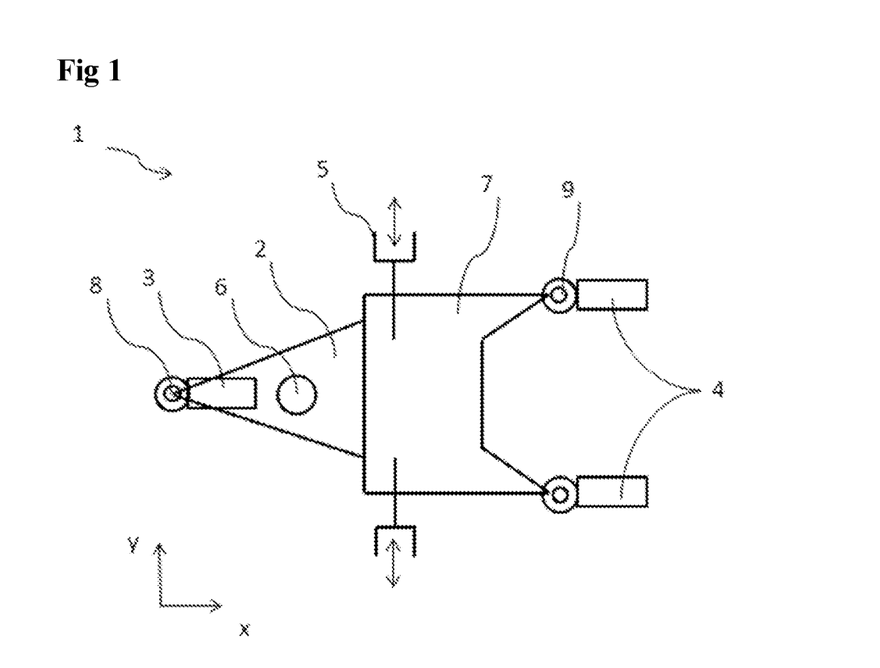
FIG. 1 is a top view of a propulsion system according to an embodiment of the invention.

FIG. 1 schematically illustrates, by way of non-limitative example, an electric propulsion system according to an embodiment of the invention. FIG. 1 is a top view of electric propulsion system 1. Electric propulsion system 1 comprises a frame 2. Axis x corresponds to the longitudinal axis of frame 2 and to the principal direction of displacement of propulsion system 1, and axis y corresponds to the lateral axis of frame 2. Frame 2 supports three wheels (alternatively, frame 2 may comprise four wheels). Frame 2 supports a wheel 3 (alternatively, frame 2 may support two wheels 3), which is a wheel driven by an electric machine (not shown). Wheel 3 is orientable with respect to frame 2, around a vertical axis 8. At the other end, frame 2 supports two wheels 4, which are wheels that are not driven by an electric machine. Wheels 4 are orientable with respect to the frame around vertical axes 9. Electric propulsion system 1 further comprises coupling means 5. According to the embodiment illustrated, electric propulsion system 1 comprises two coupling means 5 on either side of the frame in the lateral direction (axis y) in order to achieve coupling by means of two wheels of the rolling object (not shown). Coupling means 5 are shown in a simplified manner as a clamp. The lateral movement of the coupling means is shown by a double arrow. This lateral movement can serve for gripping and orienting the wheels of the rolling object. Coupling means 5 are arranged, in direction x, between motorized wheel 3 and non-motorized wheels 4. Furthermore, electric propulsion system 1 comprises a handlebar 6, for example in form of a rod equipped with a handle (not shown) articulated with respect to frame 2. Besides, electric propulsion system 1 comprises a supporting platform 7 (for supporting a user for example). Platform 7 is arranged at the end of frame 2 supporting non-motorized wheels 4.

Figure 2:
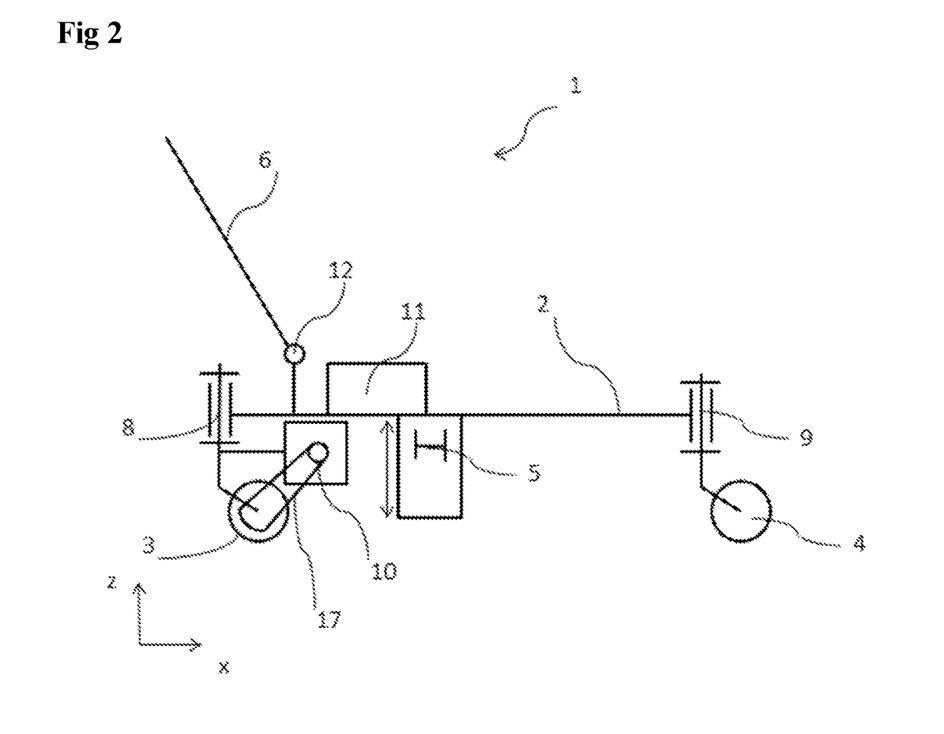
FIG. 2 is a side view of a propulsion system according to a first variant embodiment of the invention.

FIG. 2 schematically illustrates, by way of non-limitative example, an electric propulsion system according to a first variant embodiment of the invention. FIG. 2 is a side view of electric propulsion system 1. Electric propulsion system 1 comprises a frame 2. Axis x corresponds to the longitudinal axis of frame 2 and to the principal direction of displacement of the propulsion system, and axis z corresponds to the vertical axis of frame 2. The frame supports three wheels. Frame 2 supports a wheel 3, which is a wheel driven by an electric machine 10 by means of a drive 17, a belt or a chain for example (alternatively, electric machine 10 may be directly connected to wheel 3). Wheel 3 is orientable with respect to frame 2, around a vertical axis 8. Electric machine 10 can be integral with pivot 8 of motorized wheel 3. At the other end, frame 2 supports two wheels 4, which are not driven by an electric machine. Wheels 4 are orientable with respect to the frame, around vertical axes 9. Electric propulsion system 1 further comprises coupling means 5. According to the embodiment illustrated, electric propulsion system 1 comprises two coupling means 5 on either side of the frame in the lateral direction (axis y) in order to achieve coupling by means of two wheels of the rolling object (not shown). Coupling means 5 are shown in a simplified manner as a clamp. The vertical movement of coupling means 5 is shown by a double arrow. This vertical movement of the coupling means notably allows the wheels of the rolling object to be lifted. Coupling means 5 are arranged, in direction x, between motorized wheel 3 and non-motorized wheels 4. Furthermore, electric propulsion system 1 comprises a handlebar 6, for example in form of a rod equipped with a handle (not shown) articulated with respect to frame 2 by means of a joint 12 of horizontal axis, in the lateral direction of frame 2 (perpendicular to the plane of the figure). Besides, electric propulsion system 1 comprises a battery 11. Battery 11 is arranged on frame 2 close to electric machine 10 and motorized wheel 3.

Figure 3:
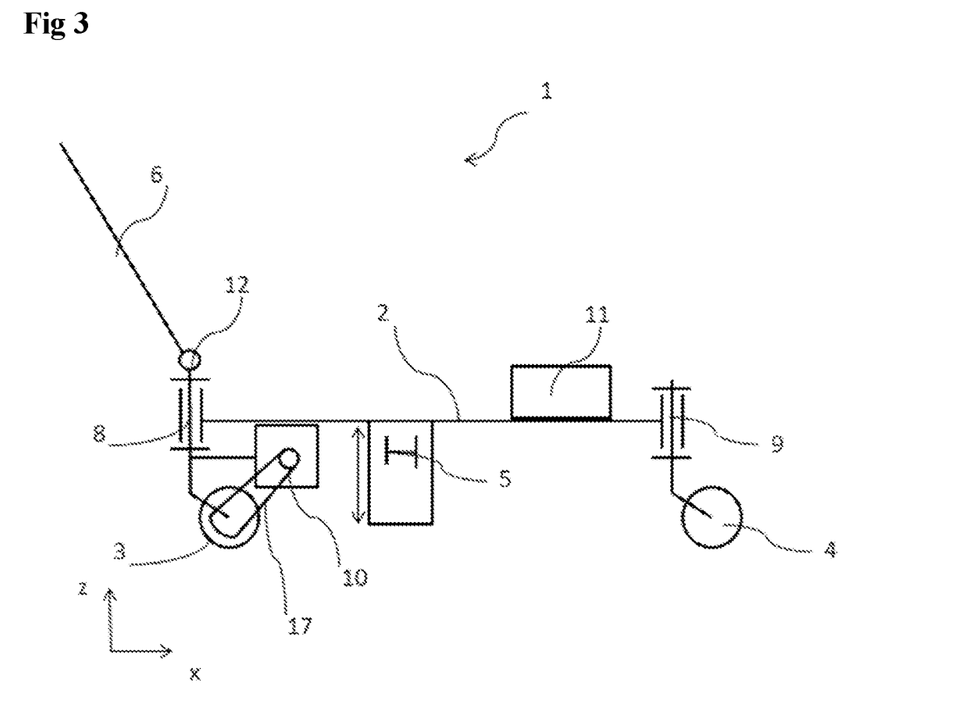
FIG. 3 is a side view of a propulsion system according to a second variant embodiment of the invention.

FIG. 3 schematically illustrates, by way of non-limitative example, an electric propulsion system according to a second variant embodiment of the invention. FIG. 3 is a side view of electric propulsion system. Electric propulsion system 1 comprises a frame 2. Axis x corresponds to the longitudinal axis of frame 2 and to the principal direction of displacement of the propulsion system, and axis z corresponds to the vertical axis of frame 2. The frame supports three wheels. Frame 2 supports a wheel 3, which is a wheel driven by an electric machine 10 by means of a drive 17, a belt or a chain for example. Wheel 3 is orientable with respect to frame 2, around a vertical axis 8. Electric machine 10 can be integral with pivot 8 of motorized wheel 3. At the other end, frame 2 supports two wheels 4, which are not driven by an electric machine. Wheels 4 are orientable with respect to the frame, around vertical axes 9. Electric propulsion system 1 further comprises coupling means 5. According to the embodiment illustrated, electric propulsion system 1 comprises two coupling means 5 on either side of the frame in the lateral direction (axis y) in order to achieve coupling by means of two wheels of the rolling object (not shown). Coupling means 5 are shown in a simplified manner as a clamp. The vertical movement of coupling means 5 is shown by a double arrow. This vertical movement of the coupling means notably allows the wheels of the rolling object to be lifted. Coupling means 5 are arranged, in direction x, between motorized wheel 3 and non-motorized wheels 4. Furthermore, electric propulsion system 1 comprises a handlebar 6, for example in form of a rod equipped with a handle (not shown) articulated with respect to vertical orientation axis 8 of motorized wheel 3 by means of a joint 12 of horizontal axis, parallel to the rotation axis of the motorized wheel. Besides, electric propulsion system 1 comprises a battery 11. Battery 11 is arranged on frame 2 close to non-motorized wheels 4.

Figure 4:
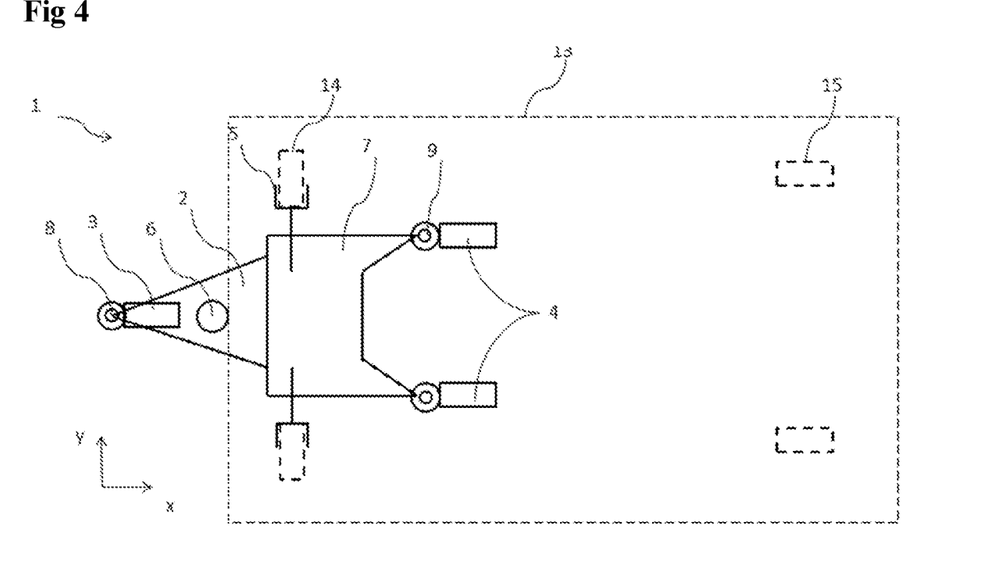
FIG. 4 is a top view of a propulsion system according to an embodiment coupled to a rolling object.

FIG. 4 schematically illustrates, by way of non-limitative example, an electric propulsion system according to an embodiment of the invention coupled to a rolling object 13. FIG. 4 is a top view of electric propulsion system 1 and of rolling object 13. The embodiment of FIG. 4 corresponds to the embodiment of FIG. 1. Rolling object 13 can be of any type, notably a rolling bed. The rolling object comprises two wheels 14, arbitrarily referred to as rear wheels, and two wheels 15, arbitrarily referred to as front wheels. Electric propulsion system 1 comprises a frame 2. Axis x corresponds to the longitudinal axis of frame 2 and to the principal direction of displacement of the propulsion system, and axis y corresponds to the lateral axis of frame 2. The frame supports three wheels. Frame 2 supports a wheel 3, which is a wheel driven by an electric machine (not shown). Wheel 3 is orientable with respect to frame 2, around a vertical axis 8. At the other end, frame 2 supports two wheels 4, which are wheels that are not driven by an electric machine. Wheels 4 are orientable with respect to the frame around vertical axes 9. Electric propulsion system 1 further comprises coupling means 5. According to the embodiment illustrated, electric propulsion system 1 comprises two coupling means 5 on either side of the frame in the lateral direction (axis y) in order to achieve coupling by means of two rear wheels 14 of the rolling object. Coupling means 5 are shown in a simplified manner as a clamp. Rear wheels 14 of the rolling object are arranged in the clamp and oriented along axis y, i.e. an axis perpendicular to the longitudinal axis (axis x) of frame 2. Furthermore, front wheels 15 of the rolling object are free and not coupled. Electric propulsion system 1 also comprises a handlebar 6, for example in form of a rod equipped with a handle (not shown) articulated with respect to frame 2. Besides, electric propulsion system 1 comprises a supporting platform 7 (for supporting a user for example). Platform 7 is arranged at the end of frame 2 supporting non-motorized wheels 4. For the embodiment of FIG. 4, coupling means 5, non-motorized wheels 4, platform 7 and a major part of frame 2 are located under the rolling object. Only motorized wheel 3 and handlebar 6 can protrude from rolling object 13 in the longitudinal direction x of frame 2.

Figure 5:
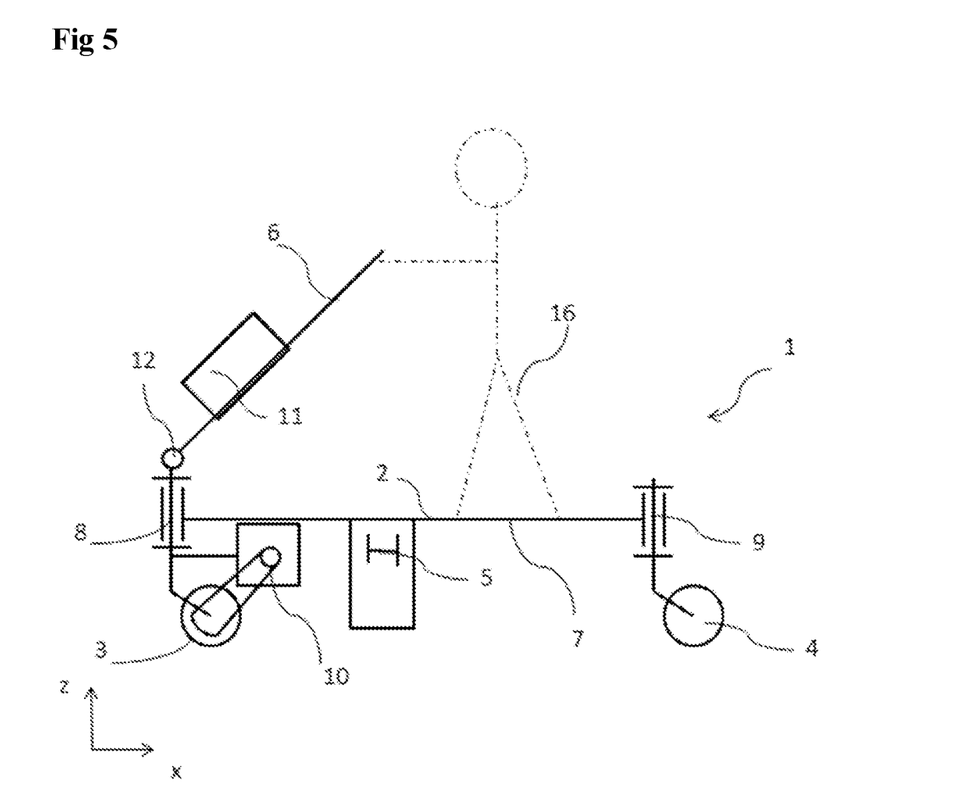
FIG. 5 is a side view of a propulsion system according to an embodiment of the invention for movement of a rolling object on which a user rides.

FIG. 5 schematically illustrates, by way of non-limitative example, an electric propulsion system according to the first variant embodiment of the invention, electric propulsion system 1 being used as a scooter by a user 16. FIG. 5 is a side view of propulsion system 1. The propulsion system of FIG. 5 substantially corresponds to the propulsion system of FIG. 3. Electric propulsion system 1 comprises a frame 2. Axis x corresponds to the longitudinal axis of frame 2 and to the principal direction of displacement of the propulsion system, and axis z corresponds to the vertical axis of frame 2. The frame supports three wheels. Frame 2 supports a wheel 3, which is a wheel driven by an electric machine 10 by means of a drive 17, a belt or a chain for example. Wheel 3 is orientable with respect to frame 2, around a vertical axis 8. Electric machine 10 can be integral with pivot 8 of motorized wheel 3. At the other end, frame 2 supports two wheels 4, which are not driven by an electric machine. Wheels 4 are orientable with respect to the frame, around vertical axes 9. Electric propulsion system 1 further comprises coupling means 5. According to the embodiment illustrated, electric propulsion system 1 comprises two coupling means 5 on either side of the frame in the lateral direction (axis y) in order to achieve coupling by means of two wheels of the rolling object (not shown). Coupling means 5 are shown in a simplified manner as a clamp. Coupling means 5 are arranged, in direction x, between motorized wheel 3 and non-motorized wheels 4. Furthermore, electric propulsion system 1 comprises a handlebar 6, for example in form of a rod equipped with a handle (not shown) articulated with respect to frame 2 by means of a joint 12 of horizontal axis, parallel to the rotation axis of the motorized wheel. Besides, electric propulsion system 1 comprises a battery 11. Battery 11 is arranged on handlebar 6. Frame 2 comprises, at the longitudinal end thereof close to non-motorized wheels 4, a platform 7. For the illustrated use of the non-coupled electric propulsion system 1, the electric propulsion system is used as a scooter by user 16: the user stands on platform 7 and holds and/or actuates handlebar 6.

The invention claimed is:

1. A removable electric propulsion system for a rolling object, the propulsion system comprising a frame provided with at least one wheel driven by an electric machine, and at least one non-driven wheel, a handlebar and means for coupling the propulsion system to the rolling object, the frame having a horizontal plane including a longitudinal direction (x) corresponding to a principal direction of displacement of the electric propulsion system, the coupling means comprising means for gripping and lifting at least one wheel of the rolling object, wherein the coupling means comprise means for orienting at least one wheel of the rolling object in a direction substantially perpendicular to the longitudinal direction (x) of the frame of the propulsion system.

2. A propulsion system as claimed in claim 1 wherein, when the propulsion system is coupled to a rolling object, the non-driven wheels are positioned under the rolling object.

3. A propulsion system as claimed in claim 1 wherein, when the propulsion system is coupled to a rolling object, the wheel driven by the electric machine is positioned outside the rolling object.

4. A propulsion system as claimed in claim 1 wherein, when the propulsion system is coupled to a rolling object, the wheel driven by the electric machine is positioned under the rolling object.

5. A propulsion system as claimed in claim 1, wherein the frame comprises a platform.

6. A propulsion system as claimed in claim 5 wherein, when the propulsion system is coupled to a rolling object, the platform is positioned under the rolling object.

7. A propulsion system as claimed in claim 1, wherein the handlebar is articulated with respect to frame around a horizontal axis.

8. A propulsion system as claimed in claim 1, wherein the handlebar is articulated with respect to an orientation axis of the wheel driven around a horizontal axis, the orientation axis rotating with respect to frame around a vertical axis (z).

9. A propulsion system as claimed in claim 1, wherein the non-driven wheels are wheels orientable around a vertical axis.

10. A propulsion system as claimed in claim 9, wherein the non-driven wheels comprise a directional locking device.

11. A propulsion system as claimed in claim 1, wherein the propulsion system comprises three or four wheels.

12. A propulsion system as claimed in claim 1, wherein the rolling object is one of a rolling bed, a trolley, rolling furniture, or a wheelchair.

13. A propulsion system as claimed in claim 1, wherein the handlebar comprises means for controlling the electric machine and/or the coupling means.

14. A propulsion system as claimed in claim 1, wherein the wheel driven by the electric machine is arranged at one end of the frame opposite the end of the frame on which the non-driven wheels are arranged.

15. A coupled assembly comprising a rolling object and an electric propulsion system as claimed in claim 1, the rolling object being coupled to the electric propulsion system by the coupling means.

16. A propulsion system as claimed in claim 5, wherein the platform is configured to provide support for a user.

17. A propulsion system as claimed in claim 9, wherein the non-driven wheels are orientable off-centered wheels.

18. A removable electric propulsion system for a rolling object, comprising:
   a frame having a horizontal plane including a longitudinal direction (x) corresponding to a principal direction of displacement of the electric propulsion system;
   at least one wheel supported on the frame and driven by an electric machine;
   at least one non-driven wheel supported on the frame;
   a handlebar enabling handling of the propulsion system by a user; and
   a clamp for gripping, lifting and orienting at least one wheel of the rolling object in a direction substantially perpendicular to the longitudinal direction (x) of the frame of the propulsion system, thereby coupling the propulsion system to the rolling object.

19. A propulsion system as claimed in claim 18, wherein, when the propulsion system is coupled to a rolling object, the wheel driven by the electric machine is positioned under the rolling object.

20. A propulsion system as claimed in claim 18, wherein the handlebar is articulated with respect to an orientation axis of the wheel driven around a horizontal axis, the orientation axis rotating with respect to frame around a vertical axis (z).

\* \* \* \* \*